(12) United States Patent
Kim

(10) Patent No.: US 7,687,946 B2
(45) Date of Patent: Mar. 30, 2010

(54) SPINDLE MOTOR

(75) Inventor: Han Cheol Kim, Hwaseong-si (KR)

(73) Assignee: LG Innotek Co., Ltd., Seoul (KR)

( * ) Notice: Subject to any disclaimer, the term of this patent is extended or adjusted under 35 U.S.C. 154(b) by 350 days.

(21) Appl. No.: 11/762,631

(22) Filed: Jun. 13, 2007

(65) Prior Publication Data
US 2007/0284972 A1    Dec. 13, 2007

(30) Foreign Application Priority Data
Jun. 13, 2006    (KR) ............... 10-2006-0052898

(51) Int. Cl.
*H02K 7/00* (2006.01)
(52) U.S. Cl. ............... 310/67 R; 310/71; 310/68 B
(58) Field of Classification Search ............... 310/67 R, 310/68 B, 71, 89–90
See application file for complete search history.

(56) References Cited

U.S. PATENT DOCUMENTS

| | | | | |
|---|---|---|---|---|
| 5,304,879 A | * | 4/1994 | Suzuki et al. ............... | 310/67 R |
| 5,319,270 A | * | 6/1994 | Tanaka et al. ............... | 310/67 R |
| 5,410,201 A | * | 4/1995 | Tanaka et al. ............... | 310/68 B |
| 5,783,880 A | * | 7/1998 | Teshima et al. ............ | 310/67 R |
| 5,872,409 A | * | 2/1999 | Jung ........................ | 310/68 B |
| 5,903,074 A | * | 5/1999 | Matsuzawa et al. ........ | 310/68 B |
| 6,020,663 A | * | 2/2000 | Furuki ...................... | 310/68 B |
| 6,097,129 A | * | 8/2000 | Furtwangler et al. ........ | 310/256 |
| 6,121,701 A | * | 9/2000 | Kloeppel et al. ............. | 310/71 |
| 6,291,914 B1 | * | 9/2001 | Mukaiyama ............... | 310/68 B |

FOREIGN PATENT DOCUMENTS

JP        2004-153945        5/2004

* cited by examiner

*Primary Examiner*—Thanh Lam
(74) *Attorney, Agent, or Firm*—Saliwanchik, Lloyd & Saliwanchik

(57) ABSTRACT

A spindle motor is disclosed. The spindle motor includes a base including a PCB, a bearing housing installed on the base and having a bearing therein, a rotating shaft rotatably supported by the bearing, a stator including a core arranged around the bearing housing and a coil wound around the core, a rotor including a rotor yoke supported by the rotating shaft and a magnet coupled to the rotor yoke, and a stopper supported by the base at an outer side of the rotor yoke, and partially located above a portion of the rotor yoke to inhibit the rotor yoke from moving upward.

14 Claims, 1 Drawing Sheet

SPINDLE MOTOR

CROSS-REFERENCE TO RELATED APPLICATION

The present application claims the benefit under 35 U.S.C. §119 of Korean Patent Application No. 10-2006-0052898, filed Jun. 13, 2006, which is hereby incorporated by reference in its entirety.

BACKGROUND

A spindle motor is applicable for various electronic appliances. For instance, the spindle motor can be used to rotate an optical disk such that data can be recorded on the optical disk or can be read out from the optical disk.

SUMMARY

Embodiments provide a spindle motor.

A spindle motor according to an embodiment can include: a base including a PCB; a bearing housing installed on the base and having a bearing therein; a rotating shaft rotatably supported by the bearing; a stator including a core arranged around the bearing housing and a coil wound around the core; a rotor including a rotor yoke supported by the rotating shaft and a magnet coupled to the rotor yoke; and a stopper supported by the base at an outer side of the rotor yoke, and partially located above a portion of the rotor yoke to inhibit the rotor yoke from moving upward.

A spindle motor according to an embodiment can include: a base including a PCB; a bearing housing installed on the base and having a bearing therein; a rotating shaft rotatably supported by the bearing; a stator including a core arranged around the bearing housing and a coil wound around the core; a rotor including a rotor yoke supported by the rotating shaft and a magnet coupled to the rotor yoke; an encoder electrically connected to the PCB to detect a rotation speed of the disk; and a support member partially located above a portion of the rotor yoke while supporting the encoder to inhibit the rotor yoke from moving upward.

DETAILED DESCRIPTION OF THE EMBODIMENTS

Figure 1:
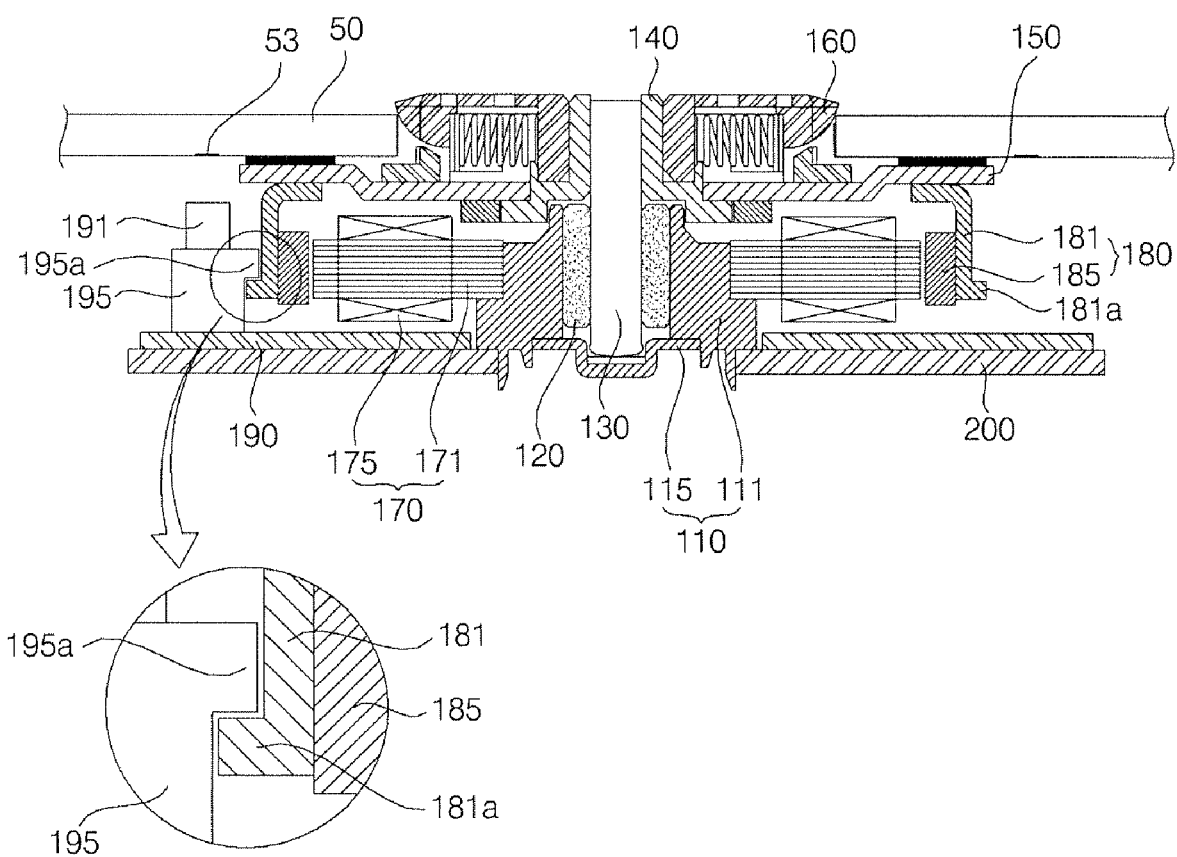
FIG. 1 is a sectional view showing the structure of a spindle motor according to an embodiment.

Hereinafter, embodiments of a spindle motor will be described in detail with reference to the accompanying drawing.

FIG. 1 is a sectional view illustrating a spindle motor according to an embodiment.

Referring to FIG. 1, a spindle motor can include a base 200, a Printed Circuit Board (PCB) 190 mounted on the base 200, and a bearing housing 110 installed on the base 200.

The bearing housing 110 can include a body 111 having a cylindrical hole, and a support plate 115 coupled to the bottom surface of the body 111.

A bearing 120 can be pressure-fitted into the bearing housing 110, and a lower portion of a rotating shaft 130 can be rotatably inserted into the bearing 120.

A rotor yoke is fixedly coupled to an outer peripheral surface of the rotating shaft 130, which protrudes upward from the bearing housing 110.

The rotor yoke can include a rotor bush 140 coupled to the rotating shaft 130, a turntable 150 coupled to an outer peripheral surface of the rotor bush 140, and a yoke 181 coupled to the turntable 150.

In an embodiment, the turntable 150 can be coupled to the rotor bush 140, and the yoke 181 can be coupled to the turntable 150. However, the rotor bush 140 and the turntable 150 can be integrally formed with each other.

A clamp 160 can be installed on the turntable 150. The clamp 160 elastically supports a disk 50 in such a manner that the center of a disk 50 mounted on the turntable 150 matches with the center of the rotating shaft 130.

A stator 170 can be fixed to the bearing housing 110 and a rotor 180 can be coupled to the turntable 150.

The stator 170 can include a core 171 fixed to an outer peripheral surface of the bearing housing 110, and a coil 175 wound around the core 171. In another embodiment, the stator 170 can be fixed to and supported by the base 200 or the PCB 190.

The rotor 180 includes the yoke 181 having a cylindrical shape, in which lower and upper center portions thereof are opened, and a magnet 185 coupled to an inner surface of the yoke 181 to surround the stator 170.

In an embodiment, the yoke 181 can be coupled to the turntable 150. However, the yoke 181 can be coupled to the rotating shaft 130 or the rotor bush 140, and rotates as the rotating shaft 130 rotates.

Accordingly, as electric current is applied to the coil 175, the rotor 180 rotates in response to interaction between the electric field generated by the coil 175 and the magnetic field generated by the magnet 185, so that the turntable 150, the rotor bush 140 and the rotating shaft 130 rotate.

In the process of assembly, carrying, installation and operation of the spindle motor, the rotating shaft 130, the rotor bush 140, the turntable 150 and the rotor 180 may be separated from the base 200, the PCB 190, the bearing housing 110 and the stator 170.

Therefore, the spindle motor may not be able to normally operate.

Accordingly, a stopper can be installed to inhibit the rotating shaft 130 from being separated from the bearing housing 110 or from moving upward.

In an embodiment, a stopper can be installed at one side of the yoke 181 to inhibit the yoke 181 from moving upward while enabling free rotation of the yoke 181.

The stopper can be installed at the base 200 or the PCB 190 while being supported by the base 200.

The stopper can be installed at the base 200 or the PCB 190 and partially protrudes toward the yoke 181.

In an embodiment, the yoke 181 can have an end extending in the horizontal direction to be located at the lower portion of the protruding portion of the stopper.

Accordingly, as the rotating shaft 130 moves upward, the end of the yoke 181 collides with the protruding portion of the stopper, so that the rotating shaft 130 can be inhibited from moving upward.

In an embodiment, the stopper can be prepared in the form of a support member supporting an encoder.

With the technical advance of an Optical Disk Drive (ODD), a new ODD has been developed and used. The new ODD has a light scribe function of forming a desired design on the surface of a Compact Disk (CD) or a Digital Versatile Disk (DVD) by using laser.

In order to reproduce information recorded on a disk or record information on the disk, the disk must be rotated at a high speed of about 5,400 rpm. In contrast, in order to form the design on the surface of the disk, the disk must be rotated at a low speed of about 40 rpm in a state in which the disk is mounted on a turntable by turning over the disk.

To this end, an encoder 191 can be installed at the spindle motor according to an embodiment in order to detect a recognition mark 53 formed on the surface of the disk 50 and determine if the disk 50 rotates at a proper speed when forming the design on the surface of the disk 50.

In more detail, the support member 195 can be fixed to the PCB 190 at a position that can correspond to the recognition mark 53, and the encoder 191 can be installed on the support member 195.

The support member 195 electrically interconnects the encoder 191 and the PCB 190 and aligns the encoder 191 at a predetermined height. For example, the support member 195 can be prepared in the form of a double-sided PCB.

The support member 195 can include a resin such as Epoxy.

In more detail, since the encoder 191 is manufactured in a small size, a support member 195 can be interposed between the encoder 191 and the PCB 190 in order to allow the distance between the encoder 191 and the disk 50 to be within the proper range.

Accordingly, the encoder 191 detects the rotation speed of the disk 50 by detecting the recognition mark 53 of the disk 50.

A protrusion 195a and a rim 181a, which engage with each other, are formed on the lateral side of the support member 195 and the outer surface of the yoke 181, respectively.

The support member 195 can be soldered to the PCB 190, and the rotor unit including the rotor 180, the turntable 150, the rotor bush 140 and the rotating shaft 130 can be inhibited from moving upward by means of the protrusion 195a and the rim 181a.

In order to separate the rotor unit from the base 200, a lead that fixes the support member 195 can be removed by applying heat, so that the support member 195 can be easily separated from the PCB 190. As a result, the rotor unit can be easily separated from the base 200.

According to a spindle motor based on an embodiment as described above, the protrusion 195a can be formed on the side of the support member 195 soldered to the PCB 190, and the rim 181a engaged with the protrusion 195a can be formed on the yoke 181.

Consequently, the rotor unit can be inhibited from being separated from the base 200. In addition, the rotor unit can be easily separated from the base 200 by disassembling the support member 195 from the PCB 190.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
    a base including a printed circuit board (PCB);
    a bearing housing on the base and having a bearing therein;
    a rotating shaft rotatably supported by the bearing;
    a stator including a core arranged around the bearing housing and a coil wound around the core;
    a rotor including a rotor yoke supported by the rotating shaft and a magnet coupled to the rotor yoke; and
    a stopper supported by the base at an outer side of the rotor yoke to inhibit the rotor yoke from moving upward,
    wherein the stopper is overlapped with the PCB and the base in a vertical direction.

2. The spindle motor according to claim 1, wherein the rotor yoke comprises a rotor bush coupled to the rotating shaft, a turntable for supporting a disk, and a yoke to which the magnet is coupled.

3. The spindle motor according to claim 2, wherein the rotor bush, the turntable and the yoke are separately manufactured as individual parts and coupled to each other.

4. The spindle motor according to claim 1, wherein the stator is coupled to the bearing housing.

5. The spindle motor according to claim 1, wherein the stopper has a first part protruding toward the rotor yoke, and the rotor yoke has a second part extending toward the stopper, so that the first part of the stopper and the second part of the rotor yoke are capable of aligning in a same vertical plane where the first part is above the second part.

6. The spindle motor according to claim 5, wherein the first part is a protrusion and the second part is a rim around the rotor yoke.

7. The spindle motor according to claim 1, further comprising a turntable coupled to the rotating shaft for supporting a disk.

8. The spindle motor according to claim 1, wherein the rotor yoke is capable of supporting a disk.

9. A spindle motor comprising:
    a base including a printed circuit board (PCB);
    a bearing housing on the base and having a bearing therein;
    a rotating shaft rotatably supported by the bearing;
    a stator including a core arranged around the bearing housing and a coil wound around the core;
    a rotor including a rotor yoke supported by the rotating shaft and a magnet coupled to the rotor yoke;
    an encoder electrically connected to the PCB to detect a rotation speed of a disk; and
    a support member to support the encoder and inhibit the rotor yoke from moving upward.

10. The spindle motor according to claim 9, wherein the support member has a first part protruding toward the rotor yoke, and the rotor yoke has a second part extending toward the support member, so that the first part of the support member and the second part of the rotor yoke are capable of aligning in a same vertical plane where the first part is above the second part.

11. The spindle motor according to claim 10, wherein the first part is a protrusion and the second part is a rim around the rotor yoke.

12. The spindle motor according to claim 9, wherein the support member comprises a double-sided PCB.

13. The spindle motor according to claim 12, wherein the double-sided PCB is made from Epoxy.

14. The spindle motor according to claim 9, wherein the support member electrically interconnects the encoder to the PCB.

* * * * *